United States Patent Office 3,634,518
Patented Jan. 11, 1972

3,634,518
PROCESS FOR PREPARING ALKYLIDENE PHOSPHORANES
Joachim Buddrus, Dortmund, Germany, assignor to Badische Anilin- & Soda-Fabrik Aktiengesellschaft, Ludwigshafen (Rhine), Germany
No Drawing. Filed June 11, 1969, Ser. No. 832,498
Claims priority, application Germany, June 15, 1968, P 17 68 680.5
Int. Cl. C07f 9/28; C07c 69/76
U.S. Cl. 260—606.5 P                    6 Claims

ABSTRACT OF THE DISCLOSURE

A process for forming in a reversible reaction an alkylidene phosphorane as used in the Wittig reaction by dehydrohalogenating the corresponding quaternary phosphonium chloride, bromide or iodide in which the phosphorus atom is connected by a single bond to a saturated carbon atom bearing at least one hydrogen atom wherein an epoxide is used as the dehydrohalogenating agent. The process preferably permits direct conversion of aldehydes or ketones into olefinic compounds by reaction with the quaternary phosphonium halide in the presence of the epoxide.

---

This invention relates to the use of epoxides for the conversion of a quaternary phosphonium halide into the corresponding alkylidene phosphorane in an equilibrium reaction; more generally, it relates to a process for the production of olefinic compounds, i.e. compounds with a new olefinic linkage, by reaction of a phosphine and an organic halogen compound, or the phosphonium salt formed therefrom, with a carbonyl compound in the presence of an epoxide, particularly ethylene oxide.

Olefins may be prepared by various methods. One of them, which is very versatile, is the process often referred to as the Wittig reaction, in which the C=O group of an aldehyde or ketone is reacted with an alkylidene phosphorane—also called ylene or ylide depending on its resonance form—to form an olefinic compound. This direct conversion of a carbonyl group into an olefinic one cannot be achieved by other methods; it is the subject of numerous publications and patents. The necessary ylene is obtained by reacting a phosphonium salt or a derivative of a phosphonic or phosphinic acid with a base. Attention is particularly directed to the very detailed disclosure in "Organic Reactions," vol. 14, Chapter 3, by A. Maercker, pp. 270–490, John Wiley & Sons, New York (1965).

For simplicity's sake, the alkylidine phosphorane will often be referred to herein as the ylene, i.e., as one of the resonance hybrids.

We have now found, surprisingly, that the formation of the ylene also takes place in the absence of a base if an epoxide is present, ethylene oxide being most advantageous, or example, ethylene oxide and triphenyl alkyl phosphonium halide react in an equilibrium reaction to form ethylenehalohydrin and ylene:

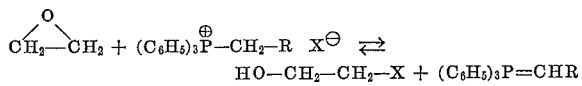

In this reaction the epoxide, particularly ethylene oxide, serves as the hydrogen halide acceptor or dehydrohalogenating agent. Instead of reacting preformed phosphonium salt with the epoxide, it is also possible and often preferable to prepare or produce the quaternary phosphonium halide in situ, i.e. in the presence of the epoxide. A possibility which is of special interest is to carry out the reaction of the quaternary phosphonium halide with the epoxide in the presence of an aldehyde or a ketone. If an aldehyde or ketone is added at the same time, complete reaction of ethylene oxide and the salt to form ethylenehalohydrin, triphenylphosphine oxide and an olefinic compound takes place. This renders the Wittig reaction particularly simple: The phosphonium salt and ethylene oxide are reacted direct with the carbonyl compound so that the separate preparation of the ylene can be dispensed with; besides, the preparation of the ylene is often impossible since it is present in the equilibrium in a low concentration only. The presence of the ylene can be proved by a red or reddish color in the reaction mixture or by its conversion into the corresponding C=C unsaturated compound when a carbonyl compound is present. In many cases it is also unnecessary to prepare the salt; triphenylphosphine, organic halogen compound and ethylene oxide are simply allowed to act on the carbonyl compound in a single zone or reaction stage. Here, one of the advantages of using an epoxide becomes apparent. The sequence in which the reactants are combined, in particular the point of time at which the epoxide is added, may be varied to a considerable extent. A number of possibilities are given below:

(1) Preparation of the quaternary phosphonium halide, addition of the epoxide and formation of the ylene in an equilibrium reaction, then addition of the carbonyl compound;

(2) Preparation of the quaternary phosphonium halide in the presence of the epoxide, at the same time or immediately afterwards formation of the ylene, then addition of the carbonyl compound;

(3) Preparation of the quarternary phosphonium halide and addition of the carbonyl compound or preparation of the quaternary phosphonium halide in the presence of the carbonyl compound, then addition of the epoxide, finally reaction with the carbonyl compound via the ylene;

(4) Placing the epoxide and the carbonyl compound in the reaction zone and adding the quaternary phosphonium halide;

(5) Mixing trisubstituted phosphine, organic halogen compound, epoxide and carbonyl compound, usually at a low temperature, and then allowing the compounds to react, generally while heating;

(6) Supplying the reactants, if desired together with a solvent, to the reaction zone through individual feed lines and allowing them to react, generally while heating;

(7) Supplying two or three of the reactants together to the reaction zone, at the same time supplying to other reactants to the reaction zone either separately or together, and allowing the mixture to react, generally while heating.

The reactants—i.e. the quaternary phosphonium halide (or the trisubstituted phosphine and the organic halogen compound), the epoxide and the carbonyl compound— react with each other in stoichiometric amounts so that each quaternary phosphorus atom needs one epoxy group and one carbonyl group. Therefore the reactants are usually interreacted in approximately stoichiometric amounts or, when each reactant bears only one reactive atom or group, in approximately equimolar amounts. It is however possible and often advantageous to use one or more reactants in excess over the stoichiometric amount As may be seen below, this applies particularly to the epoxide.

Formation of the ylene from the quuaternary phosphonium halide in the presence of an epoxide takes place at a temperature in the range of from —10° to +200° C., preferably 0 to 150° C. The other reaction steps mentioned above—i.e. the formation of the quaternary phosphonium halide and the reaction according to Wittig of the ylene with the carbonyl compound attended by the formation of a new double bond—usually proceed in the same temperature range. The specific temperature required depends on the reactivity of the various reactants and on the residence time. It is therefore possible that the quaternary phosphonium halide is advantageously prepared at a temperature which is below or above that at which the formation of the ylene under the influence of the epoxide is advantageouusly carried out. If the organic halide from which the phosphonium salt is to be formed has low reactivity, it is recommended to prepare the phosphonium salt at a higher temperature in a separate step; furthermore, if an extremely stable ylene is obtained a higher reaction temperature may be necessary for the reaction with the carbonyl compound. This also applies to the ordinary Wittig reaction. Generally, a phosphonium salt which has high acidity gives a stable ylene which reacts only slowly with a carbonyl compound, and a phosphonium salt which has low reactivity gives a more reactive ylene, which reacts more easily with a carbonyl compound.

As it is known from the Wittig reaction, phosphineoxide is obtained as a byproduct from the phosphonium moiety and the carbonyl oxygen. It is not difficult for a person skilled in the art to select the appropriate temperatures, taking the desired reaction time into account. It is often advantageous to cool the reaction mixture or the unmixed reactants to 0° C. or less at or before the start of the reaction and to raise the temperature slowly as the reaction proceeds. It may also be advantageous to heat the reaction mixture to a higher temperature, e.g. 150° to 200° C., toward the end of the reaction if it is desired to make sure that reaction is a complete as possible and if the reactants do not undergo undesirable changes as a result of these higher temperatures. As may be gathered from the fact, mentioned below, that for example ethylene oxide may at the same time be used as solvent, an excess of epoxide is not detrimental. In many cases it appears to be advantageous to use the epoxide not in an equimolar amount, with reference to quaternary phosphonium halide, but in excess in order to ensure more rapid or more complete formation of the ylene. By the process of the present invention a quaternary phosphonium halide is converted into an alkylidene phosphorane or ylene or ylide, whereby a new bond is formed between the phosphorus atom and a carbon atom which can be represented as a double bond:

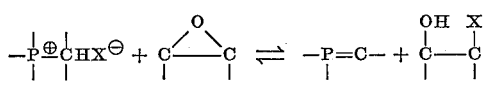

However, this bond must be regarded as a resonance hybrid linkage:

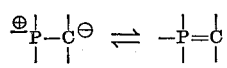

Therefore the quaternary phosphonium halide has the quaternized phosphorus atom connected by a single bond to a saturated carbon atom bearing at least one hydrogen atom, the quaternary phosphonium halide being a chloride, bromide or iodide. The quaternary phosphonium halide may contain one or two quaternized phosphorus atoms connected to carbon in the above-mentioned manner. Such quaternary phosphonium halides are well known in the art as capable of being converted into alkylidene phosphoranes under the influence of bases. Examples of such quaternary phosphonium halides are to be found in the book "Organic Reactions," vol. 14, supra, on pages 402 to 416, all such compounds being introduced herein by reference as fully as if set forth in their entirety.

Of these quaternary phosphonium halides, those compounds are of special interest in which the quaternized phosphorus atom is connected by a single bond to a non-aromatic hydrocarbon group with 1 to 22 carbon atoms, to a benzyl group which may be substituted, e.g. by one or more radicals selected from the class consisting of those of the formulae —Cl, —NO$_2$, —CH$_3$, —OCH$_3$, and —OH, or to a carbalkoxyalkyl group with 1 to 12 carbon atoms, said groups bearing at least one hydrogen atom on the carbon atom bound to the phosphorus atom. A preferred class of said quaternary phosphonium halides contains as the non-aromatic hydrocarbon radical:

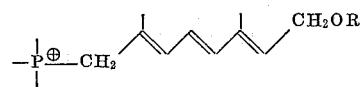

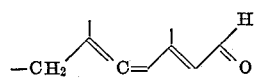

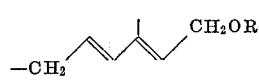

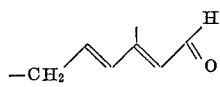

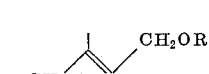

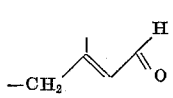

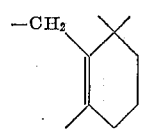

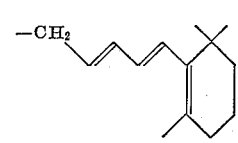

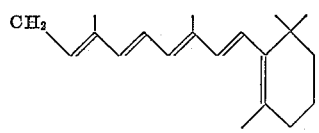

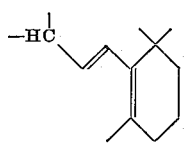

R=H or acyl, preferably aliphatic acyl such as acetyl and palmitoyl.

When these phosphonium halides are reacted for example with the following compounds, products of the vitamin-A series and more generally products of the carotenoid series are obtained:

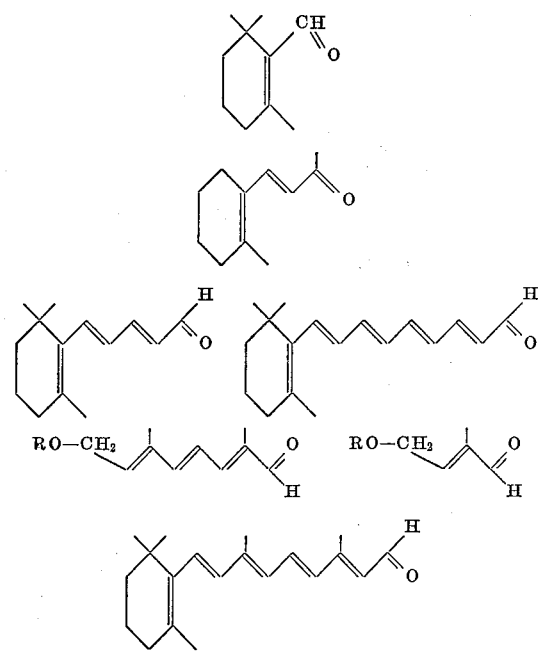

Other compounds which can be reacted according to the present invention with carbonyl compounds are those which have two phosphonium groups in the molecule. The carbon chain between the two phosphonium groups may be saturated or unsaturated. On the other hand, compounds which have two carbonyl groups in the molecule can be reacted according to this invention with the phosphonium halide. This invention therefore offers another method for the production of β-carotene, e.g.:

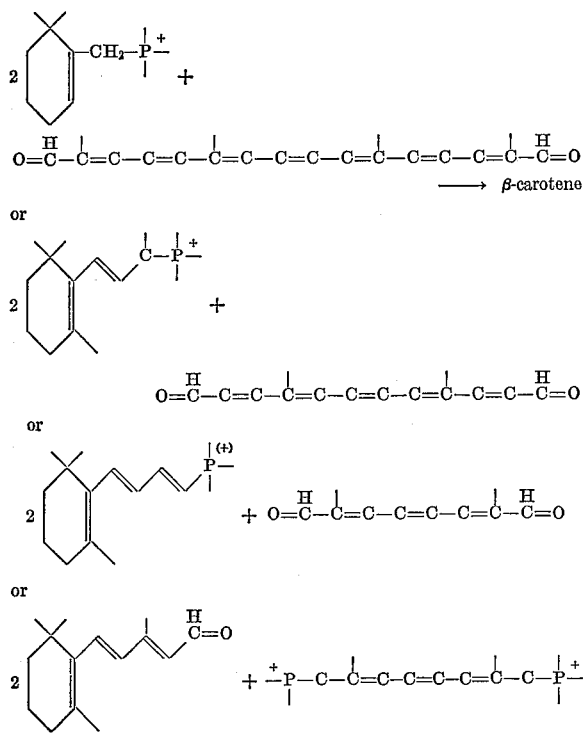

As is evident from these explanations and data, the process according to this invention offers excellent possibilities of preparing important natural substances and derivatives thereof. Moreover, the process according to this invention greatly facilitates the synthesis of food dyes and perfumes. Generally speaking, the process according to this invention is suitable for the preparation of chemical compounds by linking the carbon atom of one part of the molecule to be formed to the carbon atom of the other part of the molecule by a double bond.

The other radicals bound to the phosphorus atom of said quaternary phosphonium halides may be cycloalkyl radicals, alkyl radicals or preferably unsubstituted or alkyl-substituted phenyl radicals, for example butyl radicals, phenyl radicals, tolyl radicals and cyclohexyl radicals. For practical reasons, unsubstituted phenyl radicals are usually preferred, but in some cases alkyl radicals with 1 to 6 carbon atoms give superior results.

The quaternary phosphonium halides may be prepared in a conventional manner, e.g. by reacting the corresponding trisubstituted phosphine with an organic halogen compound in which a chlorine, bromine or iodine atom is connected to a saturated carbon atom bearing at least one hydrogen atom, or by reacting the corresponding trisubstituted phosphonium halide with an oliphatic hydroxy compound or with a polyene. The former method is generally preferred because it is the simplest one; it has the further advantage that it can be used for preparing the quaternary phosphonium halide "in situ" in the presence of an epoxide, resulting in the immediate formation of the corresponding alkylidene phosphorane in one reaction zone.

The epoxide may be any organic compound containing at least one epoxy group. Epoxides with only one epoxy group, especially those with a molecular weight of 44 to 120 are preferred because of their ready accessibility. Of these, ethylene oxide is particularly preferred. Substituted ethylene oxides, such as propylene oxide, isobutylene oxide and styrene oxide, may be used instead of the inexpensive ethylene oxide proper. Other examples of suitable epoxides are butadiene monoxide (vinylethylene oxide) and epichlorohydrin. It goes without saying that when epichlorohydrin is used it should not be present before the formation of the quaternary phosphonium salt from the organic halogen compound and the phosphine, unless the phosphine reacts with the organic halogen compound at a sufficiently higher rate than with the chlorine of the epichlorohydrin. These difficulties are avoided when epoxides are used which only contain carbon, hydrogen and oxygen.

The alkylidene phosphorane or ylene which is formed in an equilibrium reaction from the interaction of the quaternary phosphonium halide with the epoxide may be further reacted with a carbonyl compound selected from the group consisting of aldehydes and ketones, an olefinic linkage thus being formed between the two reactants.

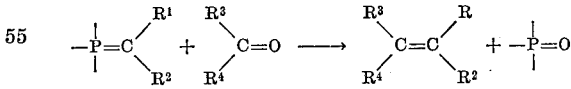

This latter step is irreversible and shifts the above-mentioned equilibrium completely to the alkylidene.

This reaction may in principle be carried out in the manner explained in detail in the above-mentioned book "Organic Reactions" on pages 270 to 490, where the well-known Wittig reaction is dealt with. The above-mentioned possibility of carrying out the reaction of the carbonyl compound with the alkylidene phosphorane generated according to the present invention in the same reaction zone is of special interest. For this embodiment of the present invention all carbonyl compounds may be used which are accessible to the conventional Wittig reaction.

The reaction may for example be carried out as follows: Reactive halides, preferably chlorides, but also bromides or iodides, for example those having the general formula R—CHR′—X (X=halogen; R=—CO$_2$R″, —CH=CHR″, —C$_6$H$_5$; R′=H, alkyl, aryl; R″=alkyl, alkenyl, phenyl) may be reacted direct with triphenylphosphine, ethylene oxide and the carbonyl compound to form olefins; excess ethylene oxide may serve as solvent and the reaction temperature is between room temperature and 100° C. depending on the stability of the betains formed as an intermediate (cf. "Organic Reactions," page 305, Formula 60). Less reactive halides R—X (R=alkyl) are advantageously first quaternized with triphenylphosphine, the salt is dissolved or suspended in a solvent, e.g. methylene chloride, chloroform, and dimethyl formamide, and the solution or suspension together with ethylene oxide and the carbonyl compound is heated to 100°–150° C. If the olefinic end products are distillable they are isolated by direct distillation without having previously been processed with water; if they have a boiling point close to that of the ethylenehalohydrin, the latter substance is extracted with water. Olefinic end products of higher molecular weight have water and naphtha added to them and are obtained from the organic phase by concentration.

As has been mentioned above, the epoxide itself may be used as solvent when it is employed in excess and at an appropriate temperature, if necessary at superatmospheric pressure. Other solvents have also been mentioned. Further examples of solvents, which should more appropriately be referred to as liquids or liquid reaction media, are dimethyl sulfoxide and hydrocarbons, such as benzene or petroleum ether. It is known that in the Wittig synthesis solvents which are inert under the reaction conditions are preferred, i.e. solvents which do not interfere with the reaction and do not enter into undesirable side reactions with the reactants. The same applies to the selection of solvents when expoxides are used in the reaction. It is therefore not difficut for a person skilled in the art to choose a suitable liquid from those available to him. The liquid may contain water, i.e. it need not be anhydrous. Mixtures of different liquids may also be used. Alcohols, e.g. methyl alcohol and ethyl alcohol, may be employed as reaction media if the reaction conditions are such that the formation of the ylene proceeds more rapidly than the undesirable epoxidation of the alcohol by the epoxide.

In the production of ylenes in the presence of bases, triphenylphosphine and triphenylphosphonium compounds are usually preferred because triphenylphosphine is readily accessible industrially and the triphenylphosphine oxide which is formed by reaction with the carbonyl compound can easily be separated from the reaction mixture. When epoxides are used in the process triphenylphosphine and triphenylphosphonium compounds are also preferred. However, it is also possible to use the other tertiary phosphines which are known as being suitable for use in the Wittig synthesis, such as tritolylphosphine and other tri(alkyl-substituted)phenylphosphines or trialkylphosphines, e.g. tributylphosphine.

The reactions are carried out in an open vessel, a pressure bottle, a sealed tube or an autoclave depending on the reaction temperature. It is also possible to operate the process continuously, using for example an endless tube system such as is described for example in French patent specification 1,523,192.

The present invention permits the overall process for the production of olefinic compounds, i.e. according to the Wittig reaction, to be carried out by means of epoxides or, in other words, epoxides are employed instead of bases or similar proton acceptors for the formation of the ylene from a quaternary phosphonium halide. The present invention thus differs from prior art processes (cf. summary in "Organic Reactions," supra) in that one can avoid conversion of the phosphonium salt into the ylene by means of a conventional base as the dehydrohalogenating agent. In many cases processing with water is also unnecessary, because no inorganic salts are formed. The simplification brought about by the present invention is particularly evident from a comparison of the processes for producing 1,4-diphenylbutadiene-(1,3) using the method according to this invention (Example 10) and the alcoholate method. Apart from the advantages in processing offered by the epoxides and apart from the fact that the use of an excess of epoxide is only slightly detrimental or not detrimental at all, the advantages of the new process have already been mentioned above. They may be summarized as follows: It is not necessary to use anhydrous solvents; the epoxide itself may be used as solvent; and the epoxide and the carbonyl compound may be introduced together into the reaction zone before the other reactants are introduced, because the two compounds are compatible with each other, whereas many bases adversely affect the carbonyl compound.

The olefins obtainable by the process according to this invention are—as is well known—natural substances, food dyes or pharmaceuticals or they may be used as intermediates in organic synthesis, for example for the production of the said end products.

The invention is further illustrated by the following examples.

EXAMPLE 1

20 ml. of ice-cooled ethylene oxide is poured into a pressure bottle and 13.2 g. of triphenylphosphine (0.051 mole), 3.3 g. of propionaldehyde (0.057 mole) and 8.4 g. of ethyl bromoacetate (0.05 mole) are successively dissolved therein. The bottle is cooled with cold water for an hour and then put aside. After 3 to 24 hours the contents are distilled and the fraction having a boiling point at 15 mm. Hg. of 50°–55° C. (11 g.) is dissolved in low-boiling petroleum ether and extracted three times with water. The solution is dried and the solvent expelled. At 53° C. (15 mm. Hg.) 5.2 of ethyl cis trans-$\beta$-ethyl acrylate (81%) distils. Its purity is 98%; the ratio of trans to cis form is 89:11. By recrystallizing the residue from the first distillation from ethyl acetate 11 g. of triphenylphosphine oxide (79%) having a melting point of 155° C. is obtained.

EXAMPLE 2

6.0 g. of triphenylphosphine (0.025 mole) and 4.2 g. of ethyl bromoacetate (0.025 mole) are dissolved in 5 ml. of $CH_2Cl_2$. The whole is cooled and then 5 ml. of ethylene oxide (0.01 mole) and 2. g. of crotonaldehyde (0.029 mole) are added. Twenty-four hours later distillation is carried out and the fraction which distils at 70°–85° C. at 17 mm. Hg is dissolved in pentane and extracted three times with water. The organic phase is distilled, 2.85 g. of pentadiene-(1,3)-carboxylic acid-(1)-ethyl ester (81%) being obtained at 87°–88° C. (18 mm. Hg). The ratio of trans to cis form is 84:16; purity 98%. The residue from the first distillation constitutes almost pure triphenylphosphine oxide (5.8 g., 83%), whose melting point is 151° C.

EXAMPLE 3

6.6 g. of triphenylphosphine (0.025 mole), 2.6 g. of benzaldehyde (0.025 mole), 2.5 ml. of ethylene oxide (0.05 mole) and—while cooling—4.2 g. of ethyl bromoacetate (0.025 mole) are dissolved in 5 ml. of methylene chloride. The solution is stored at room temperature and distilled on the following day, 2.45 g. of ethylenebromohydrin (78%), boiling point 55° C. at 17 mm. Hg, and 4.0 g. of cis/trans-cinnamic acid ethyl ester (91%), boiling point 142°–144° C. at 16 mm. Hg, being obtained. Ratio of trans to cis form: 93:7. Purity: 98%. The distillation residue solidifies to give 6.75 g. of triphenylphosphine oxide (97%), melting point 150° C.

EXAMPLE 4

3.84 g. of carbethoxymethyl triphenyl phosphonium chloride (0.01 mole) is added to 1.16 g. of propylene oxide (0.02 mole) and 1.06 g. of benzaldehyde (0.01 mole). The temperature of the mixture rises slightly. Distillation is carried out on the following day, approx. 0.5 g. (53%) of a propylenechlorohydrin mixture (1-chloro compound: 2-chloro compound=74:26) and 1.2 g. (68%) of ethyl cinnamate, boiling point 145° C. at mm. Hg, being obtained.

EXAMPLE 5

The procedure of Example 4 is followed but 1.44 g. of isobutylene oxide (0.02 mole) is used instead of propylene oxide. The isomeric isobutylenechlorohydrins (1-chloro compound:2-chloro compound=90:10) distill at 40° C. and 20 mm. Hg and 1.45 g. (83%) of ethyl cinnamate distils at 150° C. and 18 mm. Hg.

EXAMPLE 6

10 ml. of $CH_2Cl_2$, 5 g. of cyclohexanone (0.05 mole), 13.1 g. of triphenylphosphine (0.05 mole), 3 ml. of ethylene oxide (approx. 0.06 mole), 50 mg. of benzoic acid (0.0004 mole) and finally 8.4 g. of ethyl bromoacetate (0.05 mole) are introduced into a ice-cooled tube. After the heat effects have subsided (1 to 2 hours), cooling is discontinued. The opening of the tube is sealed by melting and the tube heated at 100° C. for 20 hours. The reaction product is distilled by means of a 15-cm. Vigreux column, 5.7 g. (68%) of ethyl cyclohexylidene acetate having a boiling point of 110°–115° C. at 20 mm. Hg being obtained (purity:98%). On recrystallization from ethyl acetate, the residue gives 10 g. (72%) of triphenylphosphine oxide having a melting point of 154° C.

EXAMPLE 7

25 g. of β-ionylidenethyl triphenyl phosphonium chloride (0.05 mole) is dissolved in 100 ml. of dimethyl formamide. 8 g. of γ-acetoxy-α-methylcrotonaldehyde (0.056 mole) is added to the solution at 0° C. under nitrogen. Then 10 ml. of ethylene oxide is added and the mixture is allowed to warm up to room temperature while stirring. Stirring is continued for 16 hours at room temperature and for 4 hours at 60° C. Naphtha is then added to the mixture and the whole is poured into dilute aqueous sulfuric acid. After separation of the phases extraction with naphtha is repeated twice.

The naphtha extracts are combined, dried over sodium sulfate and concentrated. 13.0 g. (79%) of vitamin A acetate oil is obtained in the form of an 11-cis/trans-all-trans mixture. UV spectrum: $\lambda_{max}$ 327 millimicrons;

$$E^{1\%}_{1\,cm.} = 1065$$

By crystallization from ethanol the pure all-trans compound is obtained in the form of yellowish prisms (melting point 58°–59° C. $\lambda_{max}$ 327 millimicrons;

$$E^{1\%}_{1\,cm.} = 1510)$$

EXAMPLE 8

62.2 g. of axerophthyl triphenyl phosphonium chloride (0.11 mole) is dissolved in 100 ml. of dimethyl formamide and the solution is mixed with a solution of 28.4 g. of vitamin A aldehyde (0.1 mole) in the 100 ml. of dimethyl formamide under nitrogen while stirring. The whole is cooled to 0° C. and then 40 ml. of ethylene oxide is added. The mixture is stirred overnight at room temperature and then for five hours at 75° C. After 6.8 g. of crystalline all-trans-β-carotene [melting point 172°–173° C.; $\lambda_{max}$ 464 millimicrons;

$$E^{1\%}_{1\,cm.} = 2200$$

(benzene)] has been filtered off, the filtrate is poured into a mixture of 200 ml. of dilute sulfuric sulfuric acid and 200 ml. of naphtha. The phases are separated and the lower phase is extracted twice. The combined extracts are washed with water, dried over sodium sulfate and concentrated. 45 g. of a dark red product is obtained as residue, which is chromatographed via aluminum trioxide (solvent: petroleum ether). After concentration of the portion which readily passes the medium, 36 g. of a dark red cis-trans mixture of β-carotenne [$\lambda_{max}$=452 millimicrons;

$$E^{1\%}_{1\,cm.} = 665$$

(cyclohexane)]. The total yield of β-carotene is 80%.

EXAMPLE 9

10 ml. of chloroform, 10 ml. of ethylene oxide, 14.00 g. of triphenylphosphine (0.053 mole), 8.55 g. of benzyl bromide (0.050 mole) and 5.80 g. of propionaldehyde (0.100 mole) are introduced into an aspirator bottle and the mixture, which is heterogeneous owing to salt formation, is stirred vigorously (magnetic stirrer) for 48 hours at room temperature, a clear solution being formed. Distillation gives 7.5 g. of a fraction having a boiling range of 80° to 120° C., which contains $CHCl_3$ and 2-ethyldioxolane-(1,3), and a fraction having a boiling range at 15 mm. Hg of 50° to 80° C., which is dissolved in pentane and extracted three times with water. The pentane solution is dried (CaCl) and distilled, 5.9 g. (89.5%) of cis,trans-β-ethyl styrene having a boiling point at 13 mm. Hg of 70° to 76° C. being obtained (purity 98%; ratio of trans form:cis form=56:44). The residue from the first distillation is dissolved in boling ethyl acetate; 2 g. of salt remain. When the filtered solution is cooled, 9.5 g. of triphenylphosphine oxide (68%) having a melting point of 155° C. is precipitated.

EXAMPLE 10

10 ml. of methylene chloride, 10 ml. of ethylene oxide, 13.1 g. of triphenylphosphine (0.05 mole), 6.4 g. of cinnamaldehyde (0.05 mole) and finally 8.5 g. of benzyl bromide (0.05 mole) are introduced into a tube. The tube is sealed and heated at 90° C. for 8 hours. The crystal slurry formed is colored slightly by means of iodine and stirred for 3 hours. After concentration in vacuo, four times the amount of methanol is added, 8.5 g. (85%) of trans-trans-1,4-diphenylbutadiene-(1,3) having a melting point of 152° C. (from methanol) is obtained by filtration.

EXAMPLE 11

3.9 of benzyl triphenyl phosphonium chloride (0.01 mole), 1.1 g. of freshly distilled benzaldehyde, 5 ml. of ethylene oxide and 5 ml. of chloroform are stirred (magnetic stirrer) in an aspirator bottle for two days at room temperature. The clear solution obtained is distilled; after the volatile constituents have been distilled off and an air cooler has been installed, 1.68 g. of a stilbene mixture (93%) is obtained at 150°–185° C. and 15 mm. Hg (purity 99%; ratio of cis form:trans form=78:22). After recrystallization the distillation residue gives 2.0 g. of triphenylphosphine oxide (72%), melting point 153° C. (from ethyl acetate).

EXAMPLE 12

19.5 g. of powdered benzyl triphenyl phosphonium chloride (0.05 mole) is placed in an ice-cooled tube; then 4.2 g. of cyclohexanone (0.05 mole), 20 ml. of ethylene oxide and 20 ml. of methylene chloride are added. The sealed tube is shaken vigorously and then heated at 90°–100° C. for 8 hours. Distillation of the clear solution obtained gives 5.9 g. (69%) of benzylidenecyclo-hexane (boiling point at 15 mm. Hg: 125°–127° Cl purity 99%). The distillation residue is boiled with a small amount of ethyl acetate; 3.5 g. of salt remains. When the mother liquor is cooled, 10.5 g. (75%) of thiphenylphosphine oxide having a melting point of 150° C. is precipitated.

EXAMPLE 13

19.3 g. of propyl triphenyl phosphonium bromide (0.05 mole), 15 ml. of $CH_2Cl_2$, 15 ml. of ethylene oxide and 7.5 g. of benzaldehyde (0.075 mole) are enclosed in a tube, which is sealed and heated at 150° C. for 8 hours. Subsequent distillation gives fraction A (boiling range 70°–120° C. at 760 mm. Hg), fraction B (boiling range 50°–80° C. at 17 mm. Hg), fraction C (boiling range 107°–117° C. at 17 mm. Hg) and a residue which is recrystallized from ethyl and gives 11.4 g. (82%) of triphenylphosphine oxide, melting point 153° C. Fractions A and B are dissolved in double the volume of pentane, shaken three times with water and again subjected to distillation. 4.2 (74%) of β-ethylstyrene having a boiling point at 16 mm. Hg of 76°–83° C. is obtained (purity 98%; ratio of cis form:trans form=60:40).

EXAMPLE 14

6.6 g. of styrene oxide (0.055 mole), 3.2 g. of propionaldehyde (0.055 mole), 13.1 g. of triphenylphosphine (0.05 mole) and 8.4 g. of ethyl bromoacetate (0.05 mole) are dissolved in 10 ml. of methylene chloride. The solution starts boiling. After one hour diethyl is added and the whole is shaken vigorously once with dilute hydrochloric acid and three times with water. The ether phase is concentrated and yields 4.0 g. (62%) of β-ethylacrylic acid ethyl ester having a boiling point at 13 mm. Hg of 54°–56° C. (purity 95%; ratio of trans form:cis form=92:8.

EXAMPLE 15

8.4 g. (0.05 mole) or ethyl bromoacetate is dripped into a solution of 10.5 g. (0.052 mole) of freshly distilled tributylphosphine and 3 g. (0.052 mole) of propionaldehyde in 22 g. (0.5 mole) of ethylene oxide while cooling with ice. After the strongly exothermic formation of the phosphonium salt has subsided, the mixture is stored for three hours at 15° to 20° C. and then subjected to vacuum distillation. The fraction having a boiling range at 13 mm. Hg of 38° to 52° C. (11.5 g.) is taken up in 50 ml. of low-boiling petroleum ether and washed four times, each time with 50 ml. of water. The organic phase is again distilled in vacuo and gives 9.2 g. (72% of the theory) of ethyl β-ethylacrylate having a boiling point at 13 mm. Hg of 41° to 44° C.

EXAMPLE 16

13.3 g. (0.051 mole) of triphenylphosphine, 3 g. (0.052 mole) of propionaldehyde and 8.4 g. (0.050 mole) of ethyl bromoacetate are introduced into 35 g. (0.5 mole) of epichlorohydrin while cooling with ice and kept at 0° C. for an hour. The mixture is then allowed to stand for three hours at room temperature. Vacuum distillation gives 12.8 g. of distillate having a boiling range at 13 mm. Hg of 39° to 54° C., which is taken up in 50 ml. of low-boiling petroleum ether. The organic phase is washed four times, each time with 50 ml. of water, and fractionated in vacuo. 7.8 g. (68% of the theory) of ethyl β-ethylacrylate distills at 42° to 44° C. and 13 mm. Hg.

EXAMPLE 17

4.67 g. of triphenyl-carbethoxymethyl-phosphonium iodide, which has been prepared from the corresponding bromide and potassium iodide, is dissolved in 3 ml. of methylene chloride. Then 1.16 g. (0.011 mole) of benzaldehyde and 1 ml. (0.02 mole) of ethylene oxide was added. The tempreature of the mixture increases slightly. After twenty minutes the reaction mixture is concentrated and fractionated. 1.5 g. of ethyl cinnamate (85%) having a boiling point at 16 mm. Hg of 141–143° C. is obtained, the ratio of trans to cis compound being 95:5.

EXAMPLE 18

13.3 g. (0.051 mole) of triphenylphosphine, 3 g. (0.052 mole) of propionaldehyde and 8.4 g. (0.050 mole) of ethyl bromoacetate are added to 30 g. (0.43 mole) of butadiene monoepoxide in a pressure bottle cooled with ice, and the mixture is kept therein for 1 hour at 0° C. The reaction mixture was then allowed to stand overnight at room temperature. Vacuum distillation gives 18.2 g. of a colorless distillate having a boiling range at 13 mm. Hg of 36° to 63° C., which according to spectroscopic analysis consists of a mixture of β-ethyl acrylic ethyl ester and the bromohydrin of butadiene. The ester is separated from the bromohydrin by column chromatograph (neutral $Al_2O_3$; benzene). 9.7 g. of ester is obtained, which is equivalent to a yield of 76% of the theory.

EXAMPLE 19

Preparation of an ylide from a phosphonium halide by means of ethylene oxide.

38 g. (0.1 mole) of triphenyl-(3-formyl)-crotyl phosphonium chloride and 44 g. (1 mole) of ethylene oxide are heated at 50° C. for one hour in a shaking autoclave. The discharge is freed from excess ethylene oxide by evaporation; a red crystal slurry remains. The crystals are filtered off by means of a fritted disc and washed with methanol. A sample of the product is recrystallized from a mixture of chloroform and ethyl acetate; it then has a melting point of 189° to 192° C. and exhibits the same properties as authentic triphenyl-(3-formyl)-crotylidene phosphorane.

I claim:

1. In a process for the formation of an alkylidene phosphorane in an equilibrium reaction by dehydrohalogenation of a quaternary phosphonium halide in which the quaternized phosphorus atom is connected by a single bond to a saturated carbon atom bearing at least one hydrogen atom, said halide being selected from the class consisting of the chloride, bromide and iodide, the step which comprises:

reacting said quaternary phosphonium halide with an epoxide as the dehydrohalogenating agent at a temperature of approximately −10° C. to +200° C.

2. A process according to claim 1, wherein the dehydrohalogenating agent is an epoxide having a molecular weight of 44 to 120.

3. A process according to claim 1, wherein the dehydrohalogenenating agent is ethylene oxide.

4. A process according to claim 1, wherein the dehydrohalogenating agent is propylene oxide.

5. A process according to claim 1, wherein the quaternary phosphonium halide is a triphenyl phosphonium halide.

6. A process according to claim 1, wherein the quaternary phosphonium halide is formed in situ.

References Cited

UNITED STATES PATENTS

| | | | |
|---|---|---|---|
| 3,262,971 | 7/1966 | Matthews | 260—606.5 F |
| 3,354,155 | 11/1967 | Tretter | 206—606.5 F |
| 3,364,245 | 1/1968 | Grayson et al. | 260—606.5 P |
| 3,373,207 | 3/1968 | Nuerrenbach et al. | 260—606.5 F |
| 3,524,886 | 8/1970 | Fried | 260—606.5 F |

TOBIAS E. LEVOW, Primary Examiner

W. F. W. BELLAMY, Assistant Examiner

U.S. Cl. X.R.

260—476, 488, 666

UNITED STATES PATENT OFFICE
CERTIFICATE OF CORRECTION

Patent No. 3,634,518      Dated January 11, 1972

Inventor(s) Joachim Buddrus

It is certified that error appears in the above-identified patent and that said Letters Patent are hereby corrected as shown below:

Column 2, line 65, "quuaternary" should read -- quaternary --; line 63, "amount As" should read -- amount. As --.

Column 5, lines 41 to 45, that portion of the formula reading "  " should read --  --.

Column 7, line 5, "betains" should read -- betaine --; line 33, "expoxides" should read -- epoxides --; line 34, "difficut" should read -- difficult --.

Column 9, line 58, delete "the".

Column 10, line 1, "$\beta$-carotenne" should read -- $\beta$-carotene --; line 20, "(CaCl)" should read -- (CaCl$_2$) --; line 24, "boling" should read -- boiling --; line 67, "thiphenylphosphine" should read -- triphenylphosphine --.

Column 11, line 59, "tempreature" should read -- temperature --.

Signed and sealed this 15th day of August 1972.

(SEAL)
Attest:

EDWARD M. FLETCHER, JR.      ROBERT GOTTSCHALK
Attesting Officer      Commissioner of Patents